(12) United States Patent
Fong et al.

(10) Patent No.: US 6,760,860 B1
(45) Date of Patent: Jul. 6, 2004

(54) AUTOMATIC RETRANSMISSION REQUEST LAYER INTERACTION IN A WIRELESS NETWORK

(75) Inventors: Mo-Han Fong, L'Orignal (CA); Zhang Hang, Nepean (CA); Geng Wu, Plano, TX (US); Derek K. Yu, Kanata (CA); Alfred R. Schmidt, Calgary (CA)

(73) Assignee: Nortel Networks Limited, St. Laurent (CA)

( * ) Notice: Subject to any disclaimer, the term of this patent is extended or adjusted under 35 U.S.C. 154(b) by 595 days.

(21) Appl. No.: 09/859,955

(22) Filed: May 17, 2001

Related U.S. Application Data (60) Provisional application No. 60/197,553, filed on Apr. 17, 2000.

(51) Int. Cl.[7] ................................................. G06F 11/00
(52) U.S. Cl. ........................................... 714/4; 370/474
(58) Field of Search ............................... 714/4, 43, 47, 714/48, 52, 55, 57, 712, 713, 821, 748, 749; 370/390, 400, 474, 389, 342

(56) References Cited

U.S. PATENT DOCUMENTS

| | | | | |
|---|---|---|---|---|
| 5,570,367 A | * | 10/1996 | Ayanoglu et al. | ........... 370/346 |
| 5,784,362 A | * | 7/1998 | Turina | ......................... 370/321 |
| 5,931,964 A | * | 8/1999 | Beming et al. | .............. 714/748 |
| 6,169,732 B1 | * | 1/2001 | Hetherington et al. | ...... 370/335 |
| 6,359,877 B1 | * | 3/2002 | Rathonyi et al. | ............ 370/349 |
| 6,625,172 B2 | * | 9/2003 | Odenwalder et al. | ........ 370/474 |
| 6,693,907 B1 | * | 2/2004 | Wesley et al. | ............... 370/390 |
| 2001/0032325 A1 | * | 10/2001 | Fong et al. | .................... 714/18 |
| 2001/0056560 A1 | * | 12/2001 | Khan et al. | .................. 714/746 |
| 2002/0108082 A1 | * | 8/2002 | McDonnell | .................. 714/748 |

* cited by examiner

Primary Examiner—Nadeem Iqbal
(74) Attorney, Agent, or Firm—Bruce Garlick (57) ABSTRACT

A base station, mobile station, and/or other terminal includes physical layer (layer 1) protocol and link layer (layer 2) protocol enhancements that interact with one another to cause the link layer protocol to inhibit is ARQ operations for data blocks having missing data packets that are still pending at the physical layer. A mobile station (or base station) receives a data packet from a base station across a wireless link. The physical layer then determines, a number, N, of data packets pending with its physical layer Automatic Retransmission reQuest (ARQ) operations. The physical layer then passes the data packet and the number, N, to a link layer operating on the mobile station. The link layer then modifies its ARQ operations based upon the number, N, of data packets pending with the physical layer ARQ operations. The link layer inhibits ARQ operations for data blocks missing data packets that are still pending with the physical layer.

26 Claims, 10 Drawing Sheets

AUTOMATIC RETRANSMISSION REQUEST LAYER INTERACTION IN A WIRELESS NETWORK

CROSS-REFERENCE TO RELATED APPLICATION

The present application claims priority pursuant to 35 U.S.C. Sec 120 to U.S. Regular application Ser. No. 09/836,488 filed Apr. 17, 2001, which claimed priority pursuant to 35 U.S.C. Sec 119(e) to U.S. Provisional Application Ser. No. 60/197,553, filed Apr. 17, 2000, both of which are hereby incorporated by reference in their entirety.

BACKGROUND

1. Technical Field

The present invention relates generally to cellular wireless communication networks; and more particularly to the servicing of packetized communications within such cellular wireless communication networks.

2. Related Art

Wireless networks are well known. Cellular wireless networks support wireless communication services in many populated areas of the world. While wireless networks were initially constructed to service voice circuit-switched voice communications, they are now called upon to support packet-switched data communications as well.

The transmission of packetized data communications within a wireless network places different demands on networks than does the transmission of voice communications. Voice communications require a sustained bandwidth with minimum signal-to-noise ratio (SNR) and continuity requirements. Data communications, on the other hand, typically are latency tolerant but have higher total throughput requirements. Conventional circuit-switched wireless networks were designed to support the well-known voice communication requirements. Thus, wireless networks (as well as conventional circuit switched telephone networks) have been adapted to service data communications, with such adaptation providing mixed results. Thus, future wired and wireless networks will likely be fully packet switched.

The Internet, Intranets, and their underlying Wide Area Networks, and Local Area Networks are all packet switched networks. In such packet switched networks, all communications to be transmitted from a source to a destination are packetized prior to transmission and reassembled upon receipt. These networks are capable of servicing both data communications and multimedia services such as Voice Over IP (VOIP) communications. Because of the requirement of interoperability between the equipment of differing vendors, various interworking standards have been developed for packet switched networks. Most operating standards of this type are based upon the well-known Industry Standards Organization (ISO) seven layer Open Systems Interconnect (OSI) model. The OSI model includes, from lowest protocol layer to highest protocol layer, (1) the physical layer, (2) the data link layer, (3) the network layer, (4) the transport layer, (5) the session layer, (6) the presentation layer, and (7) the application layer. A corresponding TCP/IP reference model includes (1) the physical layer, (2) the network interface layer, (3) the Internet layer, (4) the transport layer, and (5) the application layer. Networked devices, e.g. computer terminals, wireless network mobile stations, etc., operating according to these standards support error free transfer of data communications. Thus, almost all devices supporting data communications operate according to one or more variations of these operating standards.

In order to ensure that packets lost in transmission are retransmitted, the operating standards sometimes employ Automatic Retransmission reQuest (ARQ) operations. Generally speaking, ARQ operations are employed to automatically request retransmission of data packets that have been transmitted but not successfully received, e.g., lost data packets, erroneous data packets, etc.

For example, in a data session established between a client computer and a web server across the Internet, the client computer requests the download of a file. The web server accesses the file, subdivides the requested file into a plurality of data packets, and uniquely identifies each data packet. The web server then transmits each of the data packets to the client computer. Upon receipt of all of the data packets, the client computer combines the data packets in the correct order to reconstruct the file. However, the client computer may not successfully receive all of the data packets from the web computer due to lost/erroneous transmissions. When this occurs, the client computer automatically sends a request to the web server to retransmit a lost/erroneously received packet. ARQ operations continue until the client computer correctly receives all data packets that make up the file.

ARQ operations are particularly important in wireless networks, e.g., cellular and satellite networks that networks support wireless links between a base station and a serviced mobile station. Wireless links are subject to interference, fading, and other factors that oftentimes prevent successful first time transmission of data packets. In wireless networks, more than one protocol layer may support ARQ operations, e.g., transport layer and link layer. Further, in some networks, the physical layer (layer 1) may also support ARQ operations. During normal operations, however, the ARQ operations of the multiple protocol layers may interfere with one another. Such interference introduces additional delays in the packet data transmissions and, in some cases, may results in unnecessary higher-layer retransmission or may cause a transmission to fail by inadvertently causing a higher-layer time-out event.

Thus, there exists a need in the art for cooperative operation between ARQ operations of different protocol layers.

SUMMARY OF THE INVENTION

In order to overcome these shortcomings, among others, a base station, mobile station, and/or other terminal includes physical layer (layer 1) protocol and link layer (layer 2) protocol enhancements that interact with one another to prevent unnecessary link layer ARQ operations. These enhancements cause the link layer protocol to prevent ARQ operations for data blocks having missing data packets that are still pending at the physical layer.

According to one embodiment of the present invention, a physical layer protocol operating on a mobile station receives a data packet from a base station across a wireless link. The physical layer protocol then determines, a number, N, of data packets pending with its physical layer protocol Automatic Retransmission reQuest (ARQ) operations. The physical layer protocol then passes the data packet and the number, N, to a link layer protocol operating on the mobile station. The link layer protocol then modifies its ARQ operations based upon the number, N, of data packets pending with the physical layer protocol ARQ operations. In modifying its ARQ operations, the link layer avoids initiating ARQ operations for data blocks missing data packets that are still pending with the physical layer.

However, the link layer may also determine that it must initiate ARQ operations. According to one embodiment of these operations, upon the receipt of each data packet from the physical layer, the link layer determines its total number of missing data packets. Then, based upon the number, N, the link layer determines that physical layer ARQ operations have failed for at least one missing data packet of a corresponding data block. The link layer then initiates ARQ operations for the corresponding data block.

These operations also apply when the physical layer sends a packet erasure indication to the link layer. In such case, the physical layer determines that its ARQ operations have failed to recover a missing data packet and generates a packet erasure indication for the data packet. In such case, the physical layer also determines a number, M, of data packets pending with its ARQ operations. The physical layer then passes the data packet erasure indication to the link layer protocol operating on the mobile station. The link layer protocol then modifies its ARQ operations based upon the number, M, of data packets pending with the physical layer protocol ARQ operations.

In one particular embodiment, the link layer maintains a counter for each data block having missing data packets. Then, when the link layer determines that the counter value exceeds the number, N, it initiates ARQ operations for the data block having missing data packets. The link layer also modifies these counter values when a missing packet is received to account for the received data packet.

These operations may be embodied as method or steps performed by a base station, mobile station, or another device implementing the physical layer protocol and the link layer protocol. These operations may also be embodied in software instructions contained on a media of a base station, mobile station, or another device implementing the physical layer protocol and the link layer protocol. Further, these operations may be embodied in software operations stored on a media or transported via a computer network that may be executed by a base station, mobile station, or another device implementing the physical layer protocol and the link layer protocol.

Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
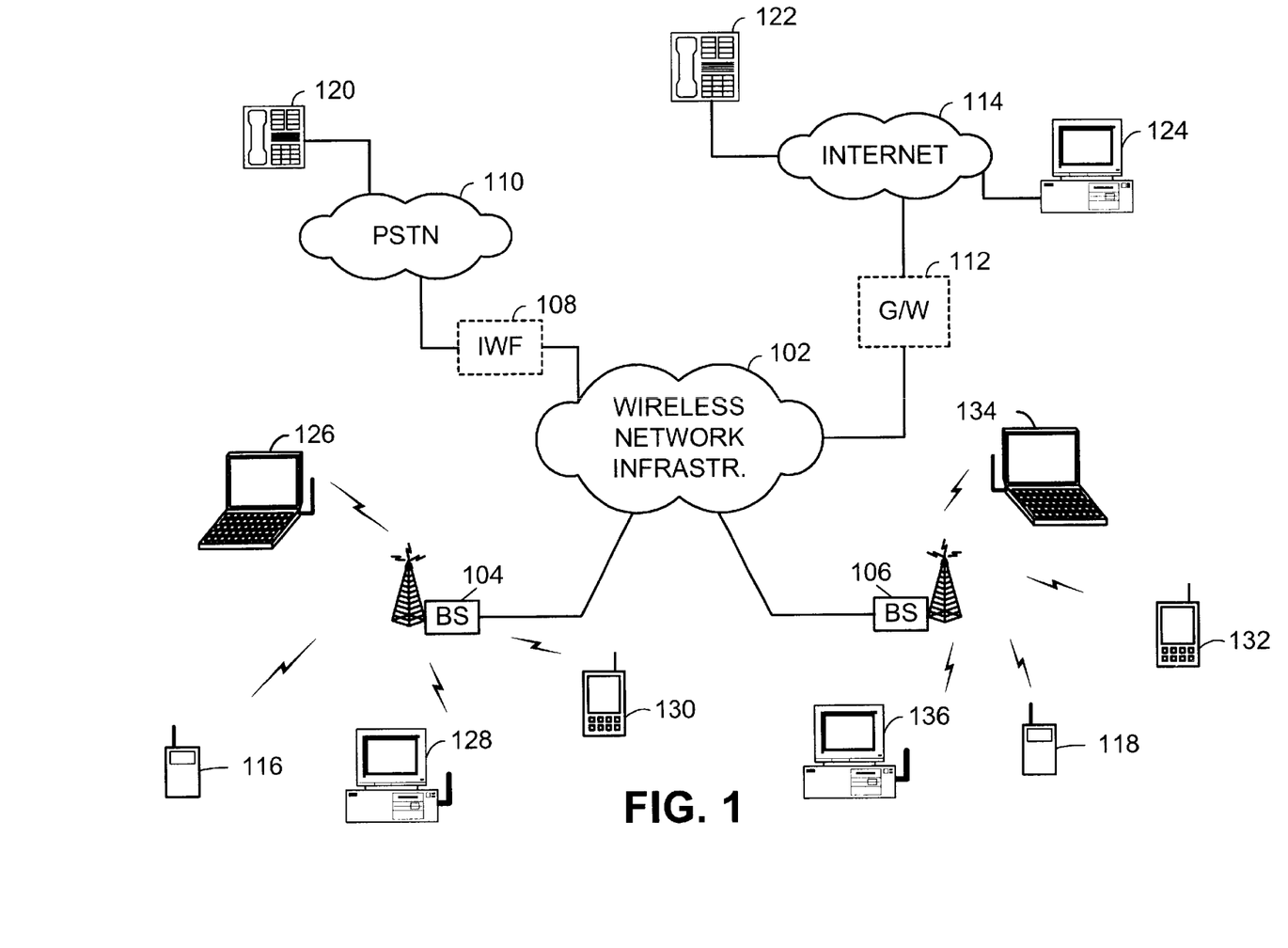
FIG. 1 is a system diagram illustrating a portion of a cellular wireless network constructed according to the present invention.

FIG. 1 is a system diagram illustrating a portion of a cellular wireless network constructed according to the present invention. The cellular wireless network includes a wireless network infrastructure 102, base station 104, and base station 106. The cellular wireless network operates according to an operating standard that may have been modified according to the present invention, e.g., HSDPA, 1xEV, etc. However, the operations of the present invention may be implemented in some cases without modification of existing standards. The wireless network infrastructure 102 couples to the Internet 114. The wireless network infrastructure 102 also couples to the Public Switched Telephone Network (PSTN) 110. In one embodiment of the present invention, the network infrastructure 102 is circuit switched, couples directly to the PSTN 110, and couples to the Internet 114 via a gateway (G/W) 112. In another embodiment of the present invention, the network infrastructure is packet switched, couples directly to the Internet 114, and couples to the PSTN via an interworking function (IWF) 108.

A conventional voice terminal 120 couples to the PSTN 110. A VoIP terminal 122 and a personal computer 124 couple to the Internet 114. Mobile stations 116, 118, 126, 128, 130, 132, 134, and 136 wirelessly couple to the wireless network via wireless links with the base stations 104 and 106. As illustrated, mobile stations may include cellular telephones 116 and 118, laptop computers 126 and 134, desktop computers 128 and 136, and data terminals 130 and 132. However, the wireless network supports communications with other types of mobile stations as well.

Each of the base stations 104 and 106 services a cell/set of sectors within which it supports wireless communications. Wireless links that include both forward link components and reverse link components support wireless communications between the base stations and their serviced mobile stations. These wireless links support both data communications and multimedia communications, such as VoIP. The teachings of the present invention may be applied equally to any type of packetized communication.

Each of the base stations 106 and 108 and at least some of the mobile stations 116, 118, 126, 128, 130, 132, 134, and 136 support layer 1 (physical layer) ARQ and layer 2 (link layer) ARQ operations. Further, according to the present invention, layer 1 ARQ operations work in cooperation with layer 2 ARQ operations to avoid unnecessary retransmission requests. Generally speaking, when layer 1 passes a data packet or a packet erasure to layer 2, it also passes to layer 2 an indication of the number of packets pending with its ARQ operations. Layer 2 keeps track of the pending layer 1 packets and does not request retransmission of data blocks corresponding to these pending layer 1 packets. These operations will be described in particular with reference to FIGS. 4–8.

Figure 2:
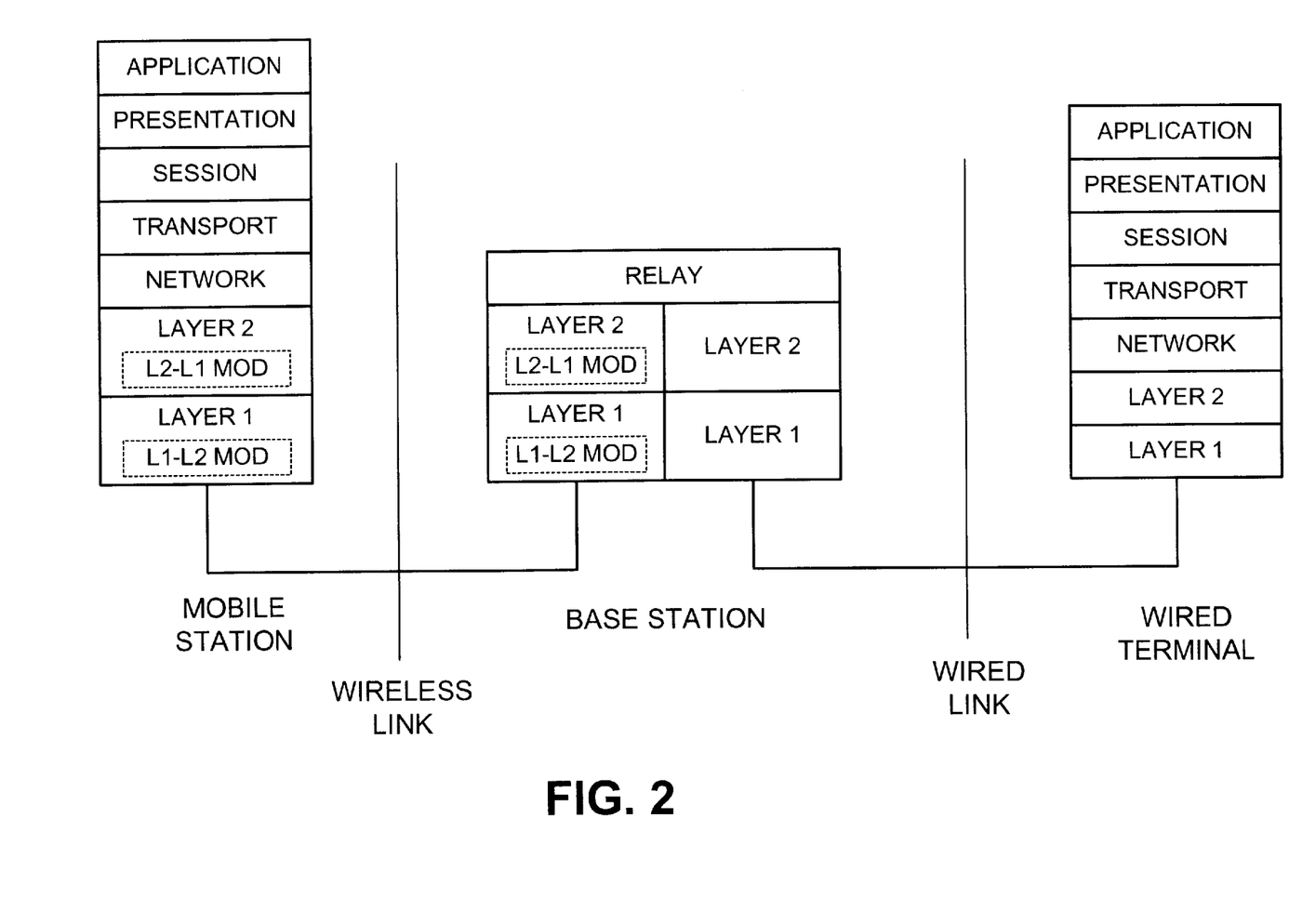
FIG. 2 is a block diagram illustrating the OSI components residing upon a mobile station and a base station that operate according to the present invention.

FIG. 2 is a block diagram illustrating the OSI components residing upon a mobile station and a base station that operate according to one embodiment of the present invention. As shown, the mobile station supports all seven ISO protocol layers. The base station may also support all seven ISO protocol layers. However, in the example of FIG. 2, the base station employs only the physical layer and link layer in servicing a communication between the mobile station and a wired terminal. In this operating scenario, the base station simply relays layer 2 packets between the mobile station and the wired terminal.

The protocol layer operations of FIG. 2 are compliant with one of a number of various standards, e.g., 1xEV, HSDPA, or another various standards. These standards will typically include both layer 1 and layer 2 components. While layer 1 is typically referred to as the physical layer, layer 2 is referred to using various terms, the particular term, e.g., Radio Link Protcol (RLP), etc., used dependent upon the standard. The teachings of the present invention may be applied to any operating standard in which layer 1 and layer 2 both support ARQ operations.

The teachings of the present invention may be applied to various ARQ operations. For example, some ARQ operations employ a "stop-and-wait" (SAW) methodology in which packets are recovered in order. However, some other ARQ operations doe not recover packets in order, e.g., Motorola's dual channel SAW, 1xEV-DO's 4 channel SAW, Lucent's asynchronous Incremental Redundancy, and Nortel's NCP (Non-complete Puncture), among others. The teachings of the present invention apply to any of these methodologies.

As is illustrated in FIG. 2, layer 1 and layer 2 of both the mobile station and the base station have been modified according to the present invention. In particular, layer 1 includes a L1-L2 modification while layer 2 includes a L2-L1 modification. As will be described further with reference to FIGS. 4–8, the L1-L2 modification causes layer 1 to report the number of packets that are pending with its ARQ operations with the presentation of each valid data packet and each with erasure. The L2-L1 modification prevents layer 2 from initiating ARQ operations for data blocks having missing data packets for which layer 1 ARQ operations are still pending.

Figure 3:
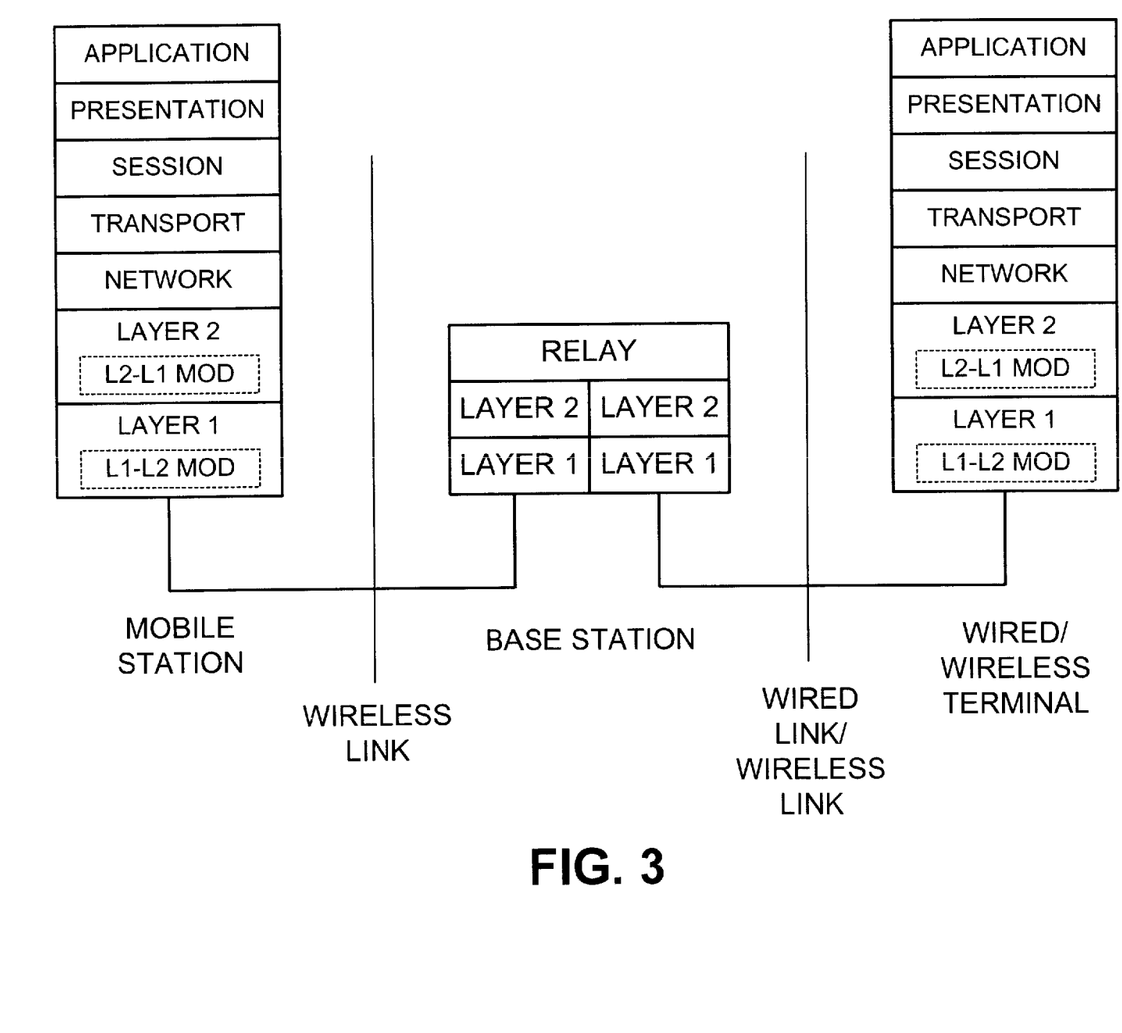
FIG. 3 is a block diagram illustrating the OSI components residing upon a mobile station and a wired/wireless terminal that operate according to the present invention.

FIG. 3 is a block diagram illustrating the OSI components residing upon a mobile station and a wired/wireless terminal that operate according to the present invention. As compared to the components of FIG. 2, in FIG. 3 the layer 1 and layer 2 modifications reside on the mobile station and the wired terminal.

While FIGS. 2 and 3 show the modifications of the present invention residing on both communicating terminals, the layer 1 and layer 2 modifications of the present invention may be implemented on a single device to provide benefits in the operation of the device. For data communications, the bulk of data transmitted is carried on the forward link from the base station to the mobile station. Including the modifications of the present invention upon the mobile station provides advantages by reducing the number of unnecessary retransmissions on the forward link. These advantages may be obtained without implementing the layer 1 and layer 2 modifications in the base station (or wired terminal).

Figure 4:
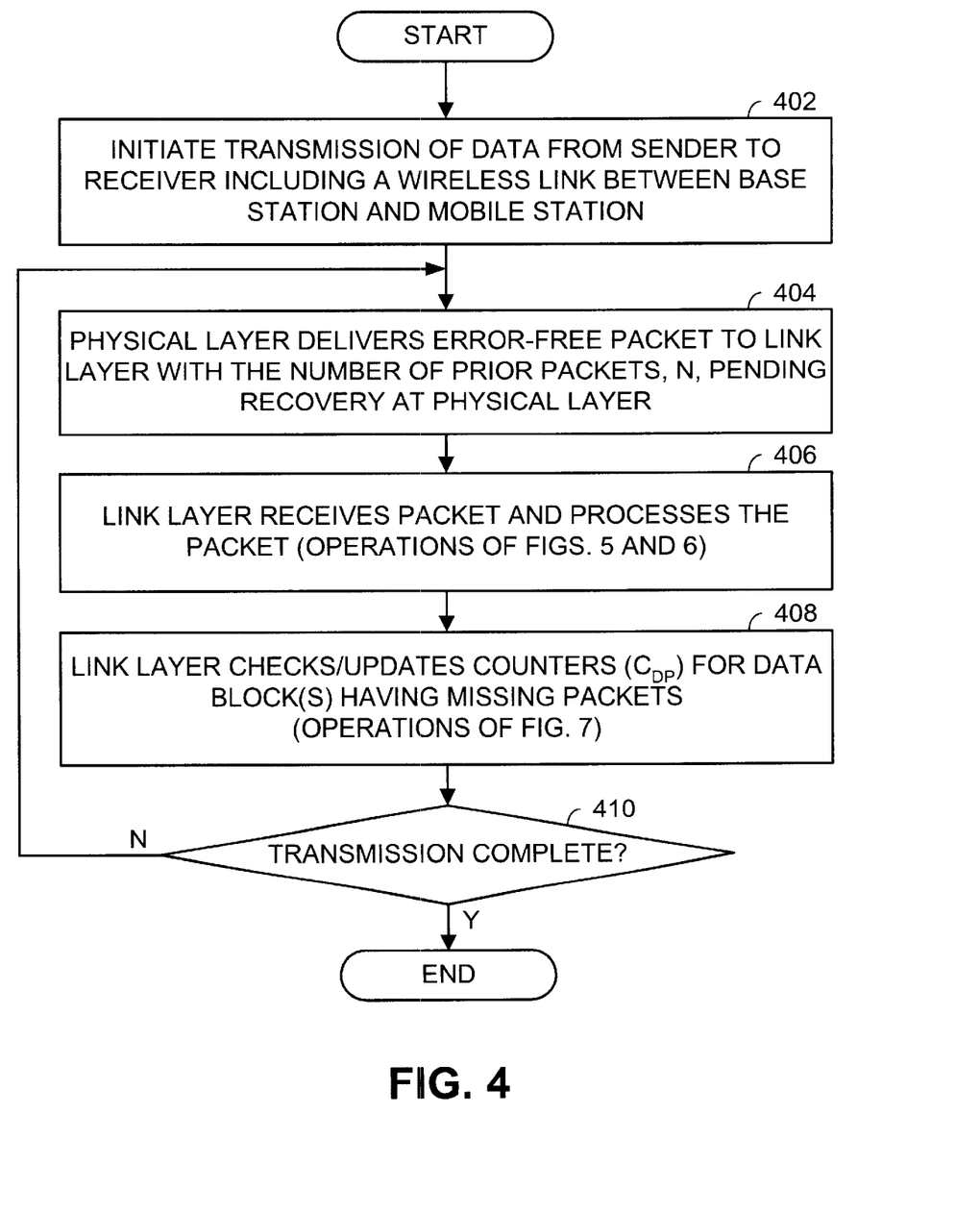
FIG. 4 is a logic diagram generally illustrating operation according to the present invention.

FIG. 4 is a logic diagram generally illustrating operation according to the present invention. Operation commences with the initiation of a transmission that includes a wireless path between a base station and a mobile station. One example of such a transmission, with particular reference to FIG. 1, occurs when mobile laptop computer 126 requests the download of a file from server computer 124 coupled to the Internet. In response to the request, the server computer 124 initiates the transmission of data to the laptop computer 126 via the Internet 114, the gateway 112 if required, the wireless network infrastructure 102, and the base station 104 to the laptop computer 124 (step 402).

In such transmission operation, layer 2 operating upon the server computer 124 segregates the file into a number of data blocks and layer 1 operating upon the server computer 124 segregates each data block into a plurality of data packets. Layer 1 (physical layer) operating upon the laptop computer 126 receives a packet, determines that it is error free, and delivers the error-free packet to layer 2 (link layer). According to the present invention, with the packet the physical layer of the laptop computer 124 also delivers the number of prior packets, N, that are pending recovery (step 404).

The link layer then receives the packet, processes the packet, and processes the pending packet indication, N (step 406, the details of which are described with reference to FIGS. 5 and 6). In another similar operation, the physical layer passes an erasure to the link layer along with a pending packet indication, M. These operations are described with reference to FIG. 8. The link layer then checks/updates the counters it maintains for data blocks having missing packets (step 408, the details of which will be described with reference to FIG. 7).

Because ARQ operations may cause packets to be received out of order, the physical layer may receive the missing data packets and pass them to the link layer out of sequence. Thus, the operations of step 408 are performed so that the link layer will only initiate ARQ operations for particular data blocks after the physical layer has completed its ARQ operations for the missing data packets of the data blocks. The operations of FIG. 4 are performed until the transmission is complete (or it fails). In such case, as determined at step 410, operation ends.

Figure 5:
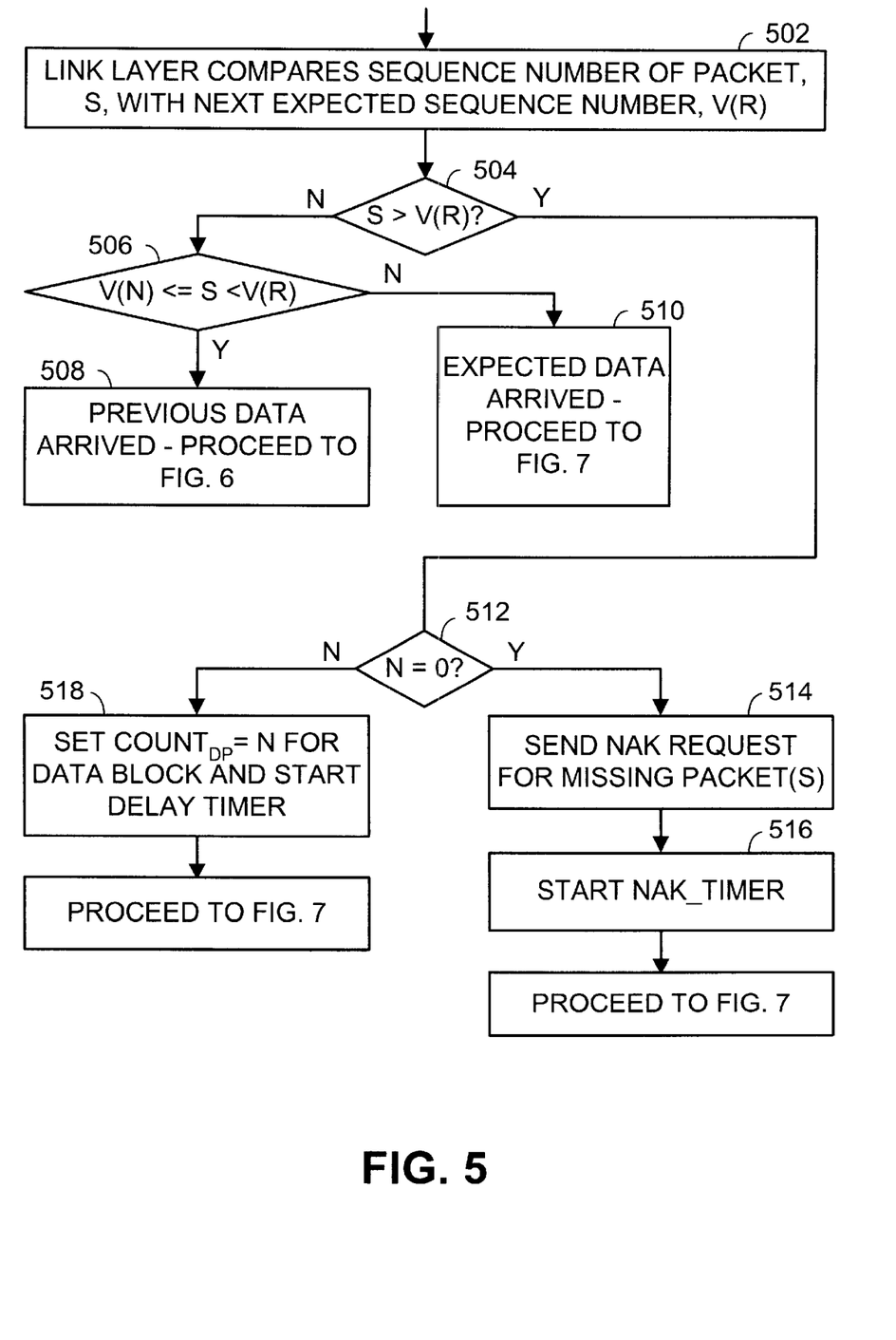
FIGS. 5 and 6 are logic diagrams illustrating operation according to the present invention by a layer 2 protocol upon receipt of a packet from a layer 1 protocol.
Figure 6:
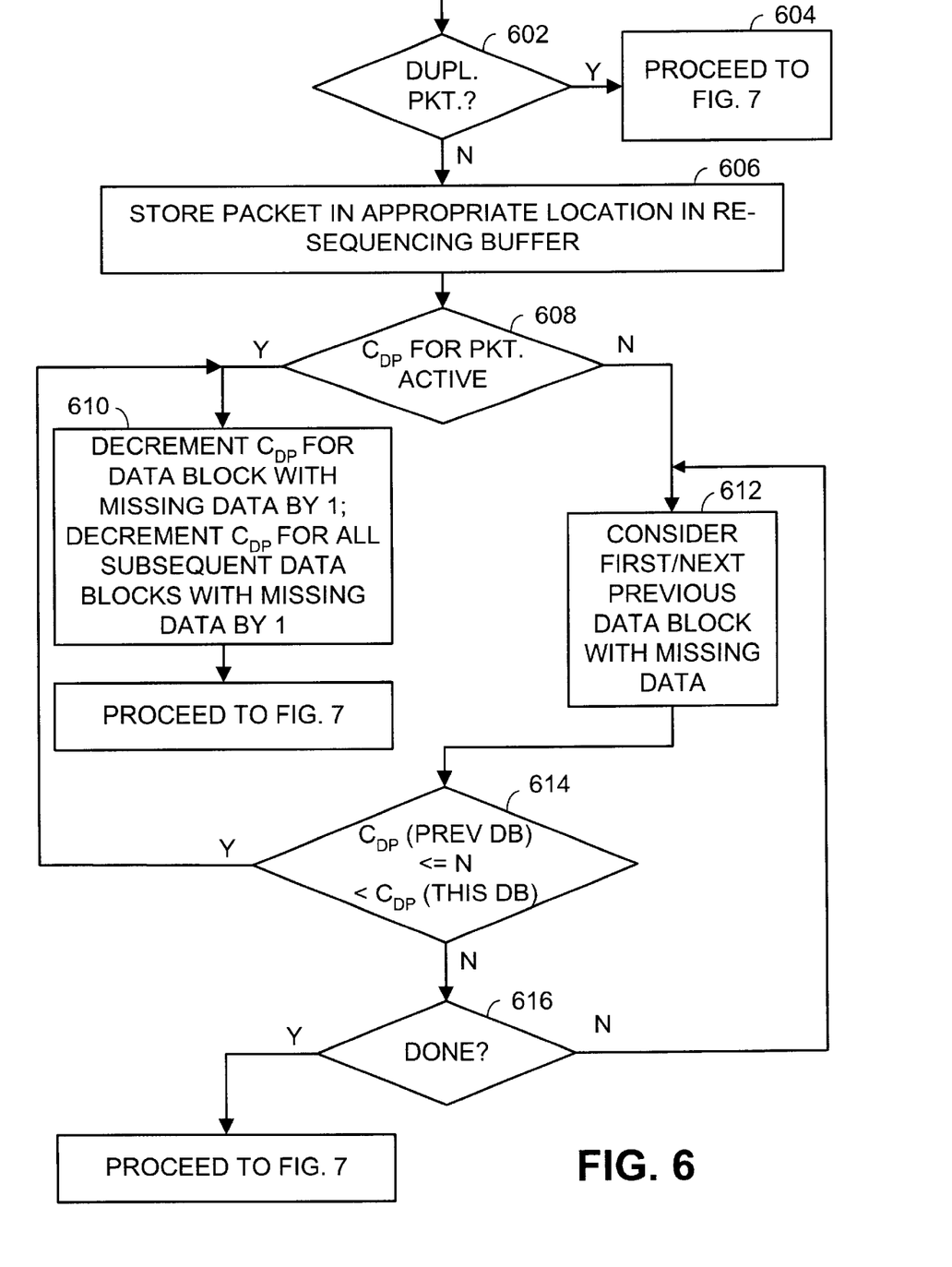

FIGS. 5 and 6 are logic diagrams illustrating operation according to the present invention by a layer 2 protocol upon receipt of a packet from a layer 1 protocol. When the physical layer delivers an error-free packet X to the link layer, it also includes the number, N, of physical layer packets prior to packet X that are pending recovery at the physical layer. When the link layer receives the physical layer packet X and the associated information N, it checks the sequence number, S, of the received physical layer packet with the next expected sequence number, V(R), maintained by the link layer (step 502). If [S >V(R) ] (step 504), the received packet has a greater sequence number than the expected physical layer packet (new data loss is detected) and operation proceeds to step 512. If [S <=V(R)] (as determined step 504), either the received physical layer packet is the expected physical layer packet or the received physical layer packet is a previously detected missing physical layer packet. Thus, it is next determined whether [V(N) <=S <V(R)] (step 506). If the determination is negative, i.e., S=V(R), the expected physical layer data packet has arrived and operation proceeds to FIG. 7 (step 510). If the determination is positive, i.e., V(N) <=S, a previously detected missing data has arrived and operation proceeds to the operations of FIG. 6 (step 508).

When new data loss is detected at step 504, operation proceeds to step 512 where it is determined whether any prior physical data packets are pending, i.e., is N=0? If other physical data blocks are also missing, i.e., N≠0, operation proceeds to step 518 where actions are taken in an attempt to recover the newly detected lost data packets. In such case, a counter $Count_{data\_pending}$ ($C_{DP}$) associated with the data block of the received physical layer packet is set to N, i.e., $C_{DP}$ =N, and a DELAY_TIMER associated with the missing data block is set (step 518). Note that a $C_{DP}$ is assigned for each data block for which missing data packets are detected. From step 518, operation proceeds to FIG. 7.

If it is determined at step 512 that N=0, i.e., the physical layer is not attempting to recover any other data packets, the link layer sends NAK requests for the missing data packets/data block (step 514). The link layer then starts a NAK timer for the missing data packets/data block (step 516) and operation proceeds to FIG. 7. If the NAK_TIMER expires before the missing data is received, the link layer ARQ protocol can either ask for the next retransmission or abort the link layer ARQ for this data block.

Referring now to FIG. 6, operations continue from step 508 of FIG. 5 where it was determined that previously detected missing data has arrived. This previous data may arrive as a result of a normal operation, a physical layer ARQ operation, or a link layer ARQ operation. Upon receipt, the link layer determines whether the received data packet is a duplicate (step 602). If the data packet is a duplicate, operation proceeds to FIG. 7 (step 604).

If the received data packet is not a duplicate (as determined at step 602), the link layer stores the packet in the appropriate location in a re-sequencing buffer (step 606). Then, the link layer determines whether an associated counter for the missing data block, $C_{DP}$, is active (step 608). If a $C_{DP}$ counter is active for the data block, the link layer reduces the $C_{DP}$ counter by one and reduces the $C_{DP}$ associated with subsequent missing data blocks by one (step 610). From step 610, operation proceeds to FIG. 7. If an associated counter for the missing data block, $C_{DP}$ is not active/is disabled (as determined at step 608) this implies that a layer 2 NAK was previously generated for this missing data packet. In such case, a first data block having missing data is considered (step 612) to determine if $C_{DP}$ (previous missing data block)<=N<$C_{DP}$ (this missing data block) (step 614). If the condition is satisfied for the missing data block under consideration, the $C_{DP}$ (this missing data block) is decremented by one and the $C_{DP}$ of all subsequent missing data blocks are decremented by one (step 610). From step 610, operation proceeds to FIG. 7. If the condition is not met for the missing data block under consideration, it is determined whether the missing data block under consideration is the last missing data block to be considered (step 616). If not, operation proceeds to step 612 wherein the next missing data block is considered. If so, operation proceeds to FIG. 7. Note that the conditional check of step 614 passes for one and only one missing data block during normal operations.

Figure 7:
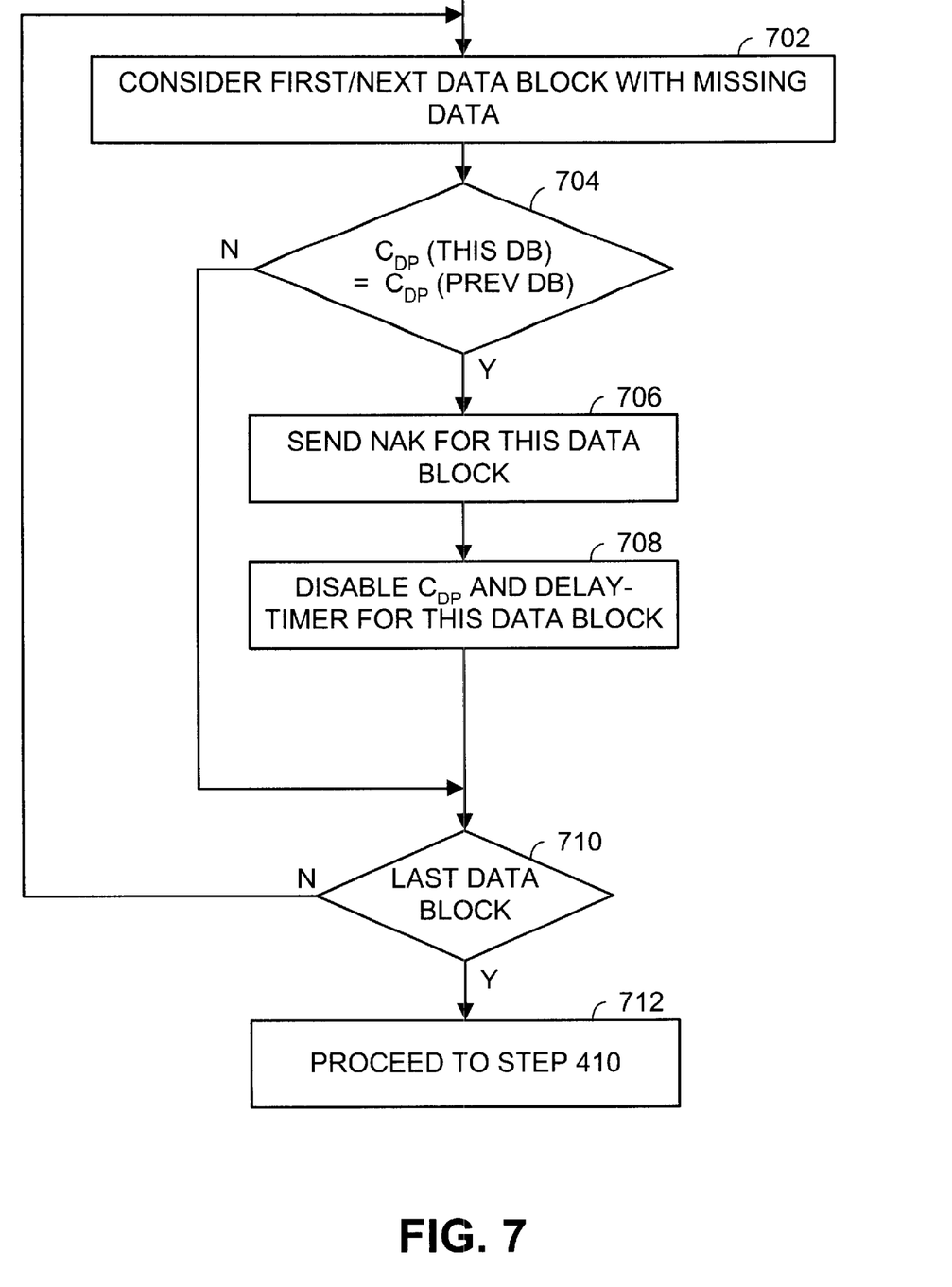
FIG. 7 is a logic diagram illustrating operation according to the present invention by a layer 2 protocol in determining whether layer 1 ARQ operations have failed for particular data block(s) and in operating accordingly.

FIG. 7 is a logic diagram illustrating operation according to the present invention by a layer 2 (link layer) protocol in determining whether layer 1 (physical layer) ARQ operations have failed for particular data block(s) and in operating accordingly. The operations of FIG. 7 are performed upon the receipt of either a packet from layer 1 or a packet erasure from layer 1. According to these operations, the link layer considers a first data block with missing data (step 702).

The link layer then checks the updated $C_{DP}$ of each missing data block to decide whether a NAK request should be generated. To make this determination, the link layer determines, for a missing data block under consideration, whether the $C_{DP}$ (this missing data block) =$C_{DP}$ (previous missing data block) at step 704. If this condition is satisfied, then ARQ operations of the physical layer have failed for this missing data block and a NAK request is for this data block (step 706). Then, the $C_{DP}$ and DELAY_TIMER associated with this data block are disabled (step 708).

From step 708, and from step 704 when the condition was not satisfied, operation proceeds to step 710 where it is determined whether the missing data block under consideration. If so, operation proceeds to step 410 of FIG. 4 (step 712). If not, operation returns to step 702 where a next data block with missing data is considered.

If the DELAY_TIMER expires before any NAK is generated for the missing data block, a NAK requesting retransmission of the data block is sent by the link layer to the physical layer. Note that the DELAY_TIMER is used as a safe-guard for the case where the physical layer is unable to detect an erasure due to poor signal-to-interference level. When this occurs, the $C_{DP}$ and DELAY_TIMER associated with the data block are disabled. The operations of the present invention may also be realized by storing the delta between N (this missing data block) and N (previous missing data block) in the $C_{DP}$ counter (this missing data block). This approach would realize the same benefits in a slightly different manner.

Figure 8:
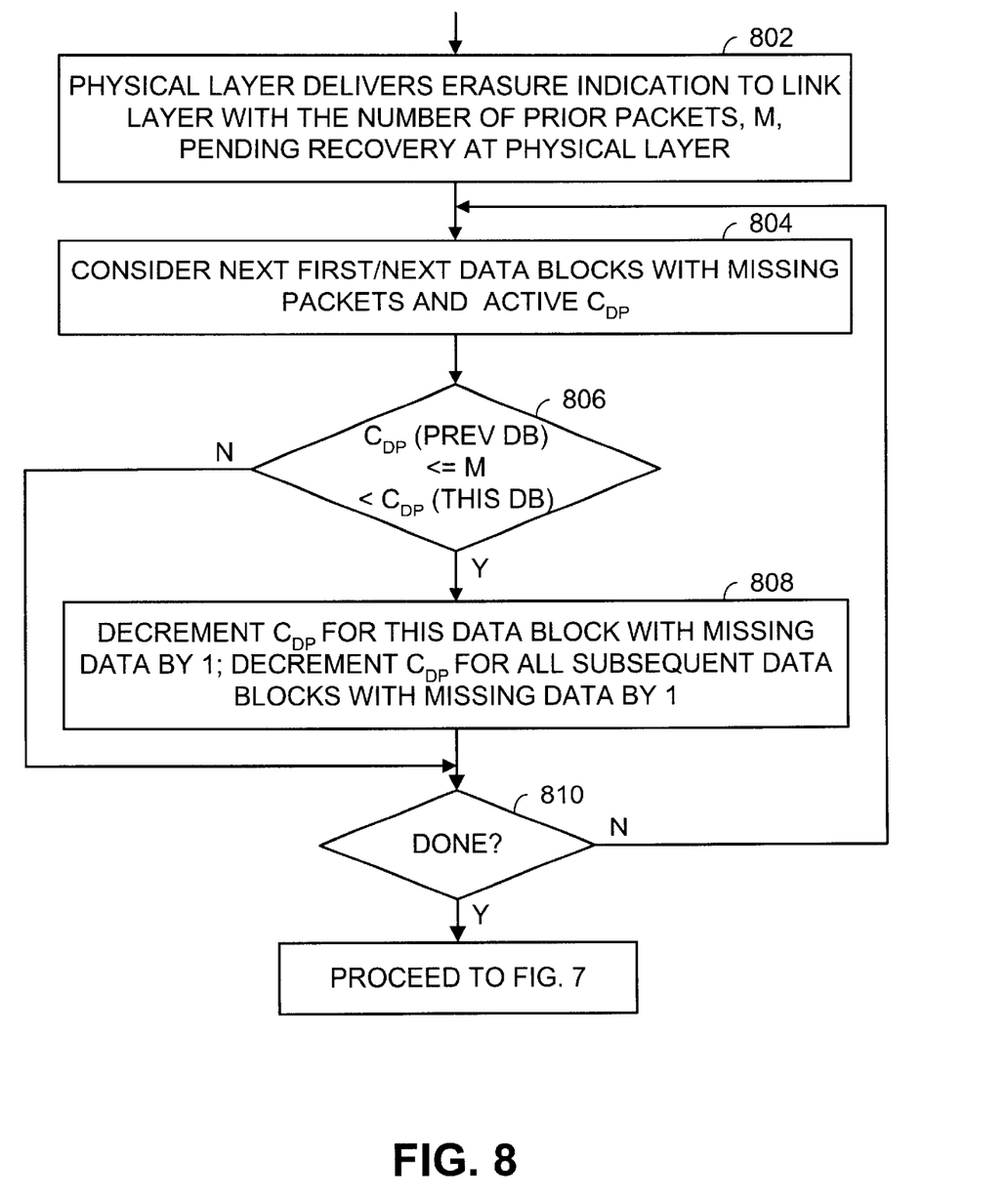
FIG. 8 is a logic diagram illustrating operation according to the present invention by a layer 2 protocol upon receipt of a data packet erasure from a layer 1 protocol.

FIG. 8 is a logic diagram illustrating operation according to the present invention by a layer 2 (link layer) protocol upon receipt of a packet erasure from a layer 1 (physical layer) protocol. When the physical layer recognizes that its ARQ operations have failed for a particular physical layer data packet, it delivers an erasure indication to the link layer with the number of prior packets, M, pending recovery at the physical layer (step 802). Based upon this information, the link layer updates its information regarding missing data blocks still have data packet recovery operations pending at the physical layer.

To accomplish this goal, the link layer considers the first data block with missing data to determine if $C_{DP}$ (previous missing data block)<=M <$C_{DP}$ (this missing data block) (step 806). If the condition is satisfied for the missing data block under consideration, the $C_{DP}$ (this missing data block) is decremented by one and the $C_{DP}$ of all subsequent missing data blocks are decremented by one (step 808). If at step 806, the condition is not satisfied, operation proceeds to step 810. At step 810, the link layer determines whether all data blocks with missing data have been considered. If not, operation returns to step 804 where the next data block with missing data is considered. If so, operation proceeds to FIG. 7.

Figure 9:
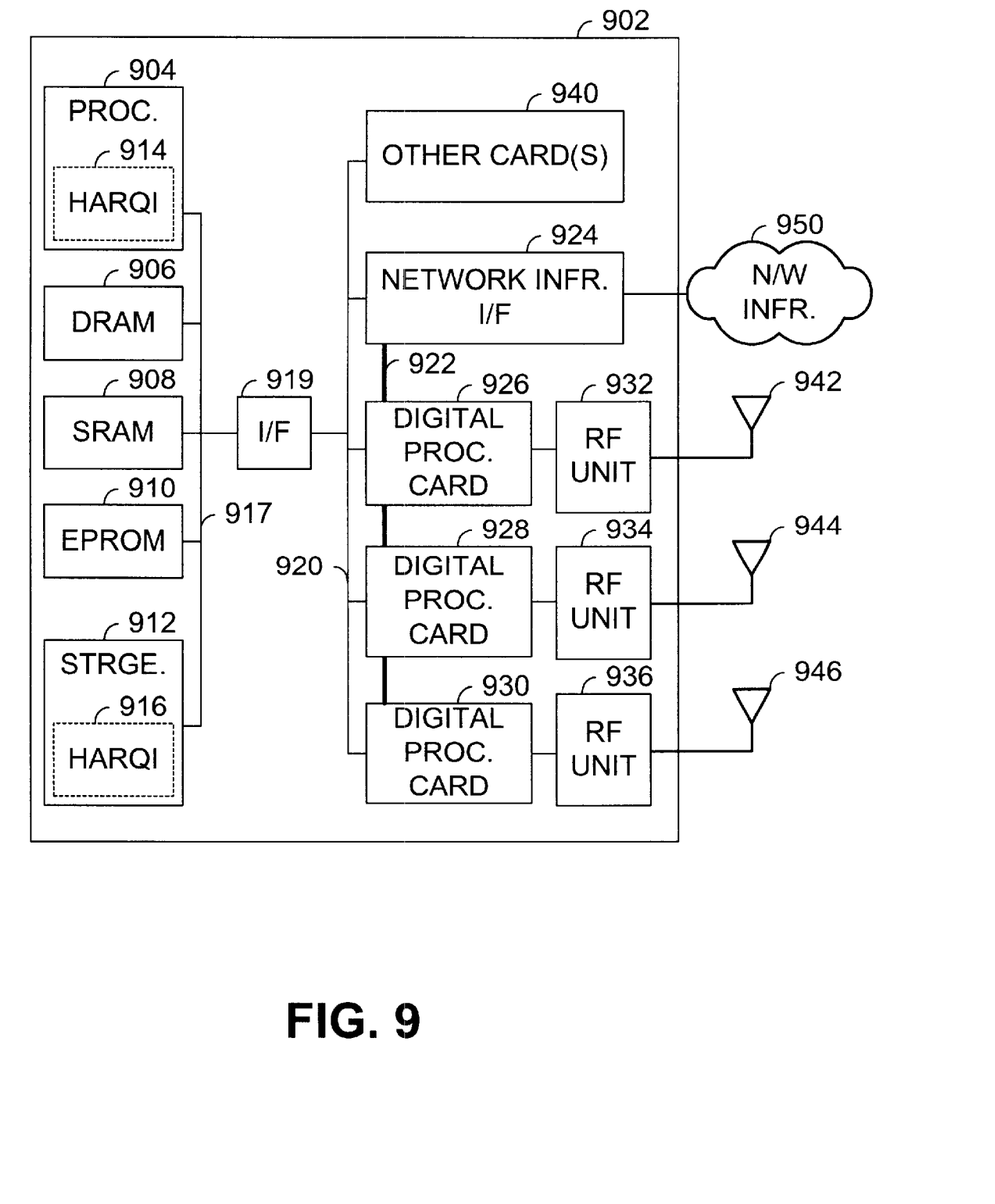
FIG. 9 is a block diagram illustrating a base station constructed according to the present invention.

FIG. 9 is a block diagram illustrating a base station 902 constructed according to the present invention. FIG. 9 is a block diagram illustrating a base station 902 constructed according to the present invention that performs the operations previously described herein. The base station 902 supports an operating protocol, e.g., IS-95A, IS-95B, IS-2000, GSM-EDGE, and/or various 3G and 4G standards that are compatible with the teachings of the present invention, with our without modification thereto. However, in other embodiments, the base station 902 supports other operating standards. The base station 902 supports protocol layer operations such as those described with reference to FIG. 2.

The base station 902 includes a processor 904, dynamic RAM 906, static RAM 908, Flash memory, EPROM 910 and at least one data storage device 912, such as a hard drive, optical drive, tape drive, etc. These components (which may be contained on a peripheral processing card or module) intercouple via a local bus 917 and couple to a peripheral bus 920 (which may be a back plane) via an interface 918. Various peripheral cards couple to the peripheral bus 920. These peripheral cards include a network infrastructure interface card 924, which couples the base station 902 to the wireless network infrastructure 950. Digital processing cards 926, 928, and 930 couple to Radio Frequency (RF) units 932, 934, and 936, respectively. Each of these digital processing cards 926, 928, and 930 performs digital processing for a respective sector, e.g., sector 1, sector 2, or sector 3, serviced by the base station 902. Thus, each of the digital processing cards 926, 928, and 930 will perform some or all of processing operations described with reference to FIGS. 6 and 7. The RF units 932, 934, and 936 couple to antennas 942, 944, and 946, respectively, and support wireless communication between the base station 902 and mobile stations (the structure of which is shown in FIG. 9). The base station 902 may include other cards 940 as well.

Hybrid Automatic Retransmission reQuest Instructions (HARQI) 916 are stored in storage 912. The HARQI 916 are downloaded to the processor 904 and/or the DRAM 906 as HARQI 914 for execution by the processor 904. While the HARQI 916 are shown to reside within storage 912 contained in base station 902, the HARQI 916 may be loaded onto portable media such as magnetic media, optical media, or electronic media. Further, the HARQI 916 may be electronically transmitted from one computer to another across a data communication path. These embodiments of the HARQI are all within the spirit and scope of the present invention.

Upon execution of the HARQI 914, the base station 902 performs operations according to the present invention previously described herein with reference to FIGS. 1–8. The HARQI 916 may also be partially executed by the digital processing cards 926, 928, and 930 and/or other components of the base station 902. Further, the structure of the base station 902 illustrated is only one of many varied base station structures that could be operated according to the teachings of the present invention.

Figure 10:
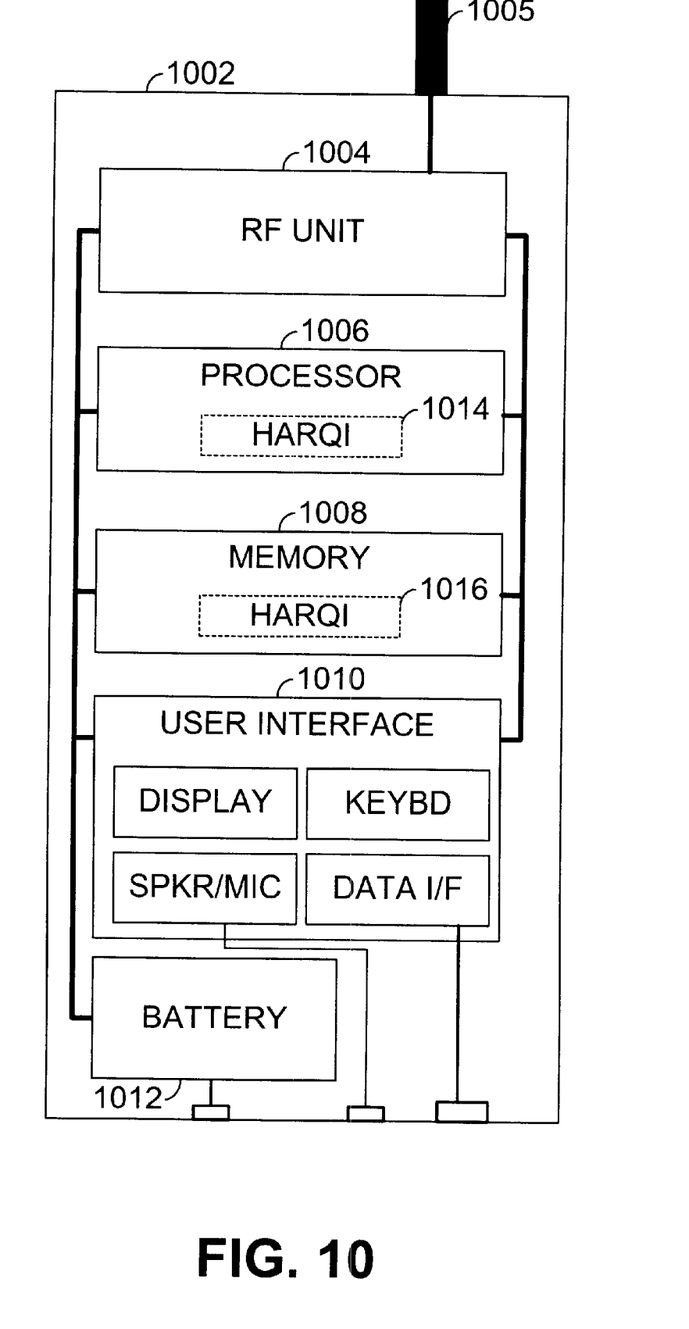
FIG. 10 is a block diagram illustrating a mobile station constructed according to the present invention.

FIG. 10 is a block diagram illustrating a mobile station 1002 constructed according to the present invention that performs the operations previously described herein. The mobile station 1002 supports a CDMA operating protocol, e.g., IS-95A, IS-95B, IS-2000, and/or various 3G and 4G standards that are compatible with the teachings of the present invention, with or without modification. However, in other embodiments, the mobile station 1002 supports other operating standards.

The mobile station 1002 includes an RF unit 1004, a processor 1006, and a memory 1008. The RF unit 1004 couples to an antenna 1005 that may be located internal or external to the case of the mobile station 1002. The processor 1006 may be an Application Specific Integrated Circuit (ASIC) or another type of processor that is capable of operating the mobile station 1002 according to the present invention. The memory 1008 includes both static and dynamic components, e.g., DRAM, SRAM, ROM, EEPROM, etc. In some embodiments, the memory 1008 may be partially or fully contained upon an ASIC that also includes the processor 1006. A user interface 1010 includes a display, a keyboard, a speaker, a microphone, and a data interface, and may include other user interface components. The RF unit 1004, the processor 1006, the memory 1008, and the user interface 1010 couple via one or more communication buses/links. A battery 1012 also couples to and powers the RF unit 1004, the processor 1006, the memory 1008, and the user interface 1010.

Hybrid Automatic Retransmission reQuest Instructions (HARQI) 1016 are stored in memory 1008. The HARQI 1016 are downloaded to the processor 1006 as HARQI 1014 for execution by the processor 1006. The HARQI 1016 may also be partially executed by the RF unit 1004 in some embodiments. The HARQI 1016 may be programmed into the mobile station 1002 at the time of manufacture, during a service provisioning operation, such as an over-the-air service provisioning operation, or during a parameter updating operation. Upon their execution, the HARQI 1014 cause the mobile station 1002 to perform operations according to the present invention previously described with reference to FIGS. 1–8.

The structure of the mobile station 1002 illustrated is only an example of one mobile station structure. Many other varied mobile station structures could be operated according to the teachings of the present invention. Upon execution of the HARQI 1014, the mobile station 1002 performs operations according to the present invention previously described herein in servicing a VOIP telephony call.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for operating a mobile station to receive packetized data from a base station, the method comprising:
   receiving, by a physical layer (layer 1) protocol operating on the mobile station, a data packet from the base station across a wireless link;
   determining, by the physical layer protocol, a number, N, of data packets pending with its physical layer protocol Automatic Retransmission reQuest (ARQ) operations;
   passing, by the physical layer protocol, the data packet and the number, N, to a link layer (layer 2) protocol operating on the mobile station; and
   modifying, by the link layer protocol, its ARQ operations based upon the number, N, of data packets pending with the physical layer protocol ARQ operations.

2. The method of claim 1, wherein:
   the link layer constructs the data blocks from data packets received from the physical layer; and
   the link layer determines its total number of missing data packets;
   based upon the number, N, the link layer determines that physical layer ARQ operations have failed for at least one missing data packet of a corresponding data block; and
   the link layer initiates ARQ operations for the corresponding data block.

3. The method of claim 1, wherein in modifying its ARQ operations, the link layer protocol inhibits the production of an ARQ operation for a data block having a missing data packet for which physical layer ARQ operations are still pending.

4. The method of claim 1, further comprising:
   determining, by the physical layer protocol operating on the mobile station, a data packet erasure;
   determining, by the physical layer protocol, a number, M, of data packets pending with its physical layer protocol Automatic Retransmission reQuest (ARQ) operations;
   passing, by the physical layer protocol, the data packet erasure to the link layer protocol operating on the mobile station along with the number, M; and modifying, by the link layer protocol, its ARQ operations based upon the number, M, of data packets pending with the physical layer protocol ARQ operations.

5. The method of claim 1, further comprising:

maintaining, by the link layer, a counter for each data block having missing data packets; and initiating, by the link layer when a counter for a data block having missing data packets exceeds the number, N, ARQ operations for the data block having missing data packets.

6. The method of claim 5, further comprising modifying, by the link layer, at least one counter for a data block having missing data packets when a missing packet is received.

7. A method for operating a base station to receive packetized data from a mobile station, the method comprising:

receiving, by a physical layer (layer 1) protocol operating on the base station, a data packet from the mobile station across a wireless link;

determining, by the physical layer protocol, a number, N, of data packets pending with its physical layer protocol Automatic Retransmission reQuest (ARQ) operations;

passing, by the physical layer protocol, the data packet and the number, N, to a link layer (layer 2) protocol operating on the mobile station; and modifying, by the link layer protocol, its ARQ operations based upon the number, N, of data packets pending with the physical layer protocol ARQ operations.

8. The method of claim 7, wherein:

the link layer constructs the data blocks from data packets received from the physical layer; and the link layer determines its total number of missing data packets;

based upon the number, N, the link layer determines that physical layer ARQ operations have failed for at least one missing data packet of a corresponding data block; and the link layer initiates ARQ operations for the corresponding data block.

9. The method of claim 7, wherein in modifying its ARQ operations, the link layer protocol inhibits the production of an ARQ operation for a data block having a missing data packet for which physical layer ARQ operations are still pending.

10. The method of claim 7, further comprising:

determining, by the physical layer protocol operating on the base station, a data packet erasure;

determining, by the physical layer protocol, a number, M, of data packets pending with its physical layer protocol Automatic Retransmission reQuest (ARQ) operations;

passing, by the physical layer protocol, the data packet erasure to the link layer protocol operating on the mobile station along with the number, M; and modifying, by the link layer protocol, its ARQ operations based upon the number, M, of data packets pending with the physical layer protocol ARQ operations.

11. The method of claim 7, further comprising:

maintaining, by the link layer, a counter for each data block having missing data packets; and initiating, by the link layer when a counter for a data block having missing data packets exceeds the number, N, ARQ operations for the data block having missing data packets.

12. The method of claim 11, further comprising modifying, by the link layer, at least one counter for a data block having missing data packets when a missing packet is received.

13. A mobile station that operates to receive packetized data from a base station, the mobile station comprising:

an antenna;

a Radio Frequency unit coupled to the antenna; and at least one digital processor coupled to the Radio Frequency unit that executes software instructions causing the mobile station to:

receive, by a physical layer (layer 1) protocol operating on the mobile station, a data packet from the base station across a wireless link;

determine, by the physical layer protocol, a number, N, of data packets pending with its physical layer protocol Automatic Retransmission reQuest (ARQ) operations;

pass, by the physical layer protocol, the data packet and the number, N, to a link layer (layer 2) protocol operating on the mobile station; and modify, by the link layer protocol, its ARQ operations based upon the number, N, of data packets pending with the physical layer protocol ARQ operations.

14. The mobile station of claim 13, wherein:

the link layer constructs the data blocks from data packets received from the physical layer; and the link layer determines its total number of missing data packets;

based upon the number, N, the link layer determines that physical layer ARQ operations have failed for at least one missing data packet of a corresponding data block; and the link layer initiates ARQ operations for the corresponding data block.

15. The mobile station of claim 13, wherein in modifying its ARQ operations, the link layer protocol inhibits the production of an ARQ operation for a data block having a missing data packet for which physical layer ARQ operations are still pending.

16. The mobile station of claim 13, wherein the software instructions further cause the mobile station to:

determine, by the physical layer protocol operating on the mobile station, a data packet erasure;

determine, by the physical layer protocol, a number, M, of data packets pending with its physical layer protocol Automatic Retransmission reQuest (ARQ) operations;

pass, by the physical layer protocol, the data packet erasure to the link layer protocol operating on the mobile station along with the number, M; and modify, by the link layer protocol, its ARQ operations based upon the number, M, of data packets pending with the physical layer protocol ARQ operations.

17. The mobile station of claim 13, wherein the software instructions further cause the mobile station to:

maintain, by the link layer, a counter for each data block having missing data packets; and initiate, by the link layer when a counter for a data block having missing data packets exceeds the number, N, ARQ operations for the data block having missing data packets.

18. The mobile station of claim 17, wherein the software instructions further cause the mobile station to modify at least one counter for a data block having missing data packets when a missing packet is received.

19. A base station that operates to receive packetized data from a mobile station, the base station comprising:

an antenna;

a Radio Frequency unit coupled to the antenna; and at least one digital processor coupled to the Radio Frequency unit that executes software instructions causing the base station to:
  receive, by a physical layer (layer 1) protocol operating on the base station, a data packet from the mobile station across a wireless link;
  determine, by the physical layer protocol, a number, N, of data packets pending with its physical layer protocol Automatic Retransmission reQuest (ARQ) operations;
  pass, by the physical layer protocol, the data packet and the number, N, to a link layer (layer 2) protocol operating on the base station; and
  modify, by the link layer protocol, its ARQ operations based upon the number, N, of data packets pending with the physical layer protocol ARQ operations.

20. The base station of claim 19, wherein:
  the link layer constructs the data blocks from data packets received from the physical layer; and
  the link layer determines its total number of missing data packets;
  based upon the number, N, the link layer determines that physical layer ARQ operations have failed for at least one missing data packet of a corresponding data block; and
  the link layer initiates ARQ operations for the corresponding data block.

21. The base station of claim 19, wherein in modifying its ARQ operations, the link layer protocol inhibits the production of an ARQ operation for a data block having a missing data packet for which physical layer ARQ operations are still pending.

22. The base station of claim 19, wherein the software instructions further cause the base station to:
  determine, by the physical layer protocol operating on the base station, a data packet erasure;
  determine, by the physical layer protocol, a number, M, of data packets pending with its physical layer protocol Automatic Retransmission reQuest (ARQ) operations;
  pass, by the physical layer protocol, the data packet erasure to the link layer protocol operating on the base station along with the number, M; and
  modify, by the link layer protocol, its ARQ operations based upon the number, M, of data packets pending with the physical layer protocol ARQ operations.

23. The base station of claim 19, wherein the software instructions further cause the base station to:
  maintain, by the link layer, a counter for each data block having missing data packets; and
  initiate, by the link layer when a counter for a data block having missing data packets exceeds the number, N, ARQ operations for the data block having missing data packets.

24. The base station of claim 23, wherein the software instructions further cause the base station to modify at least one counter for a data block having missing data packets when a missing packet is received.

25. A plurality of software instructions stored on a media that, upon execution by a mobile station, cause the mobile station to receive packetized data from a base station, the plurality of software instructions comprising:
  a set of instructions executed by the mobile station that cause the mobile station to receive, by a physical layer (layer 1) protocol operating on the mobile station, a data packet from the base station across a wireless link;
  a set of instructions executed by the mobile station that cause the mobile station to determine, by the physical layer protocol, a number, N, of data packets pending with its physical layer protocol Automatic Retransmission reQuest (ARQ) operation;
  a set of instructions executed by the mobile station that cause the mobile station to pass, by the physical layer protocol, the data packet and the number, N, to a link layer (layer 2) protocol operating on the mobile station; and
  a set of instructions executed by the mobile station that cause the mobile station to modify, by the link layer protocol, its ARQ operations based upon the number, N, of data packets pending with the physical layer protocol ARQ operations.

26. A plurality of software instructions stored on a media that, upon execution by a base station, cause the base station to receive packetized data from a mobile station, the plurality of software instructions comprising:
  a set of instructions executed by the base station that cause the base station to receive, by a physical layer (layer 1) protocol operating on the base station, a data packet from the mobile station across a wireless link;
  a set of instructions executed by the base station that cause the base station to determine, by the physical layer protocol, a number, N, of data packets pending with its physical layer protocol Automatic Retransmission reQuest (ARQ) operation;
  a set of instructions executed by the base station that cause the base station to pass, by the physical layer protocol, the data packet and the number, N, to a link layer (layer 2) protocol operating on the mobile station; and
  a set of instructions executed by the base station that cause the base station to modify, by the link layer protocol, its ARQ operations based upon the number, N, of data packets pending with the physical layer protocol ARQ operations.

* * * * *